No. 857,852. PATENTED JUNE 25, 1907.
G. WIARD.
PLOW.
APPLICATION FILED OCT. 3, 1904.

Witnesses:—
R. W. Rumsey
E. A. Vock.

Inventor.
George Wiard
by Wilhelm, Parker & Hard,
Attorneys.

UNITED STATES PATENT OFFICE.

GEORGE WIARD, OF BATAVIA, NEW YORK, ASSIGNOR TO WIARD PLOW COMPANY, OF BATAVIA, NEW YORK.

PLOW.

No. 857,852.     Specification of Letters Patent.     Patented June 25, 1907.

Application filed October 3, 1904. Serial No. 226,897.

To all whom it may concern:

Be it known that I, GEORGE WIARD, a citizen of the United States, residing at Batavia, in the county of Genesee and State of New York, have invented a new and useful Improvement in Plows, of which the following is a specification.

This invention relates to that class of plows in which the handle bars are made of metal, for instance, steel or iron, and has for its objects to connect the handle bars with each other by light and rigid braces and to construct the handle bars in such manner that they protect the handles against injury in use.

Figure 1:
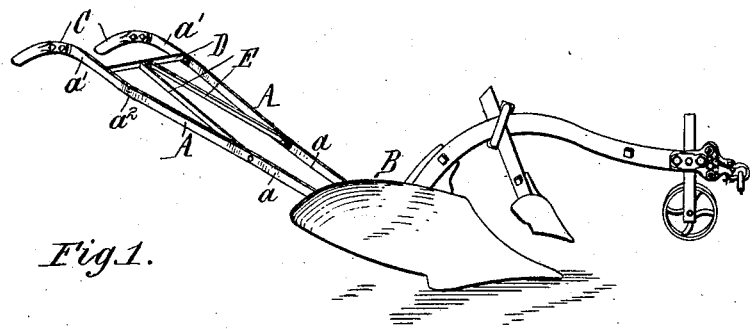
Figure 2:
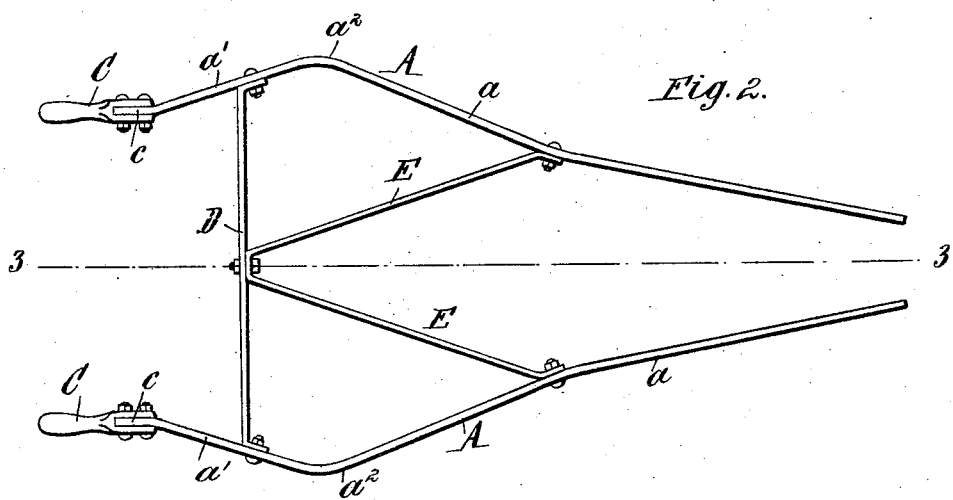
Figure 3:
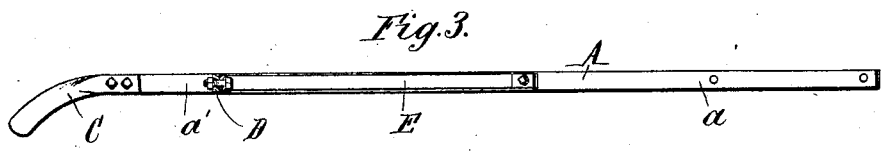

In the accompanying drawings: Figure 1 is a perspective view of a plow provided with my improvements. Fig. 2 is a top plan view of the handle bars and connecting parts. Fig. 3 is a longitudinal sectional side elevation thereof in line 3—3, Fig. 2.

Like letters of reference refer to like parts in the several figures.

A represents the oblique handle bars which are secured at their front ends to the plow standard B or some other suitable supporting part in any suitable or well known manner. The handle bars have their main portions $a$ converging forwardly, as usual, and have their rear portions $a'$ converging rearwardly to the handles C which are secured to the rear or attaching ends $c$ of the handle bars and are preferably arranged parallel to each other. The handle bars have laterally-projecting, salient or bulging portions $a^2$ which are arranged forward of the handles, preferably, as shown, between the main portions $a$ and rear portions $a'$ of the bars.

D represents a cross brace which connects the handle bars at a short distance forward of their ends. This brace is a straight, stiff bar and forms a rigid, inflexible connection between the rear portions of the handle bars.

E E represent two forwardly-diverging brace bars which extend from the middle portion of the transverse brace D to the front or main portions $a$ of the handle bars and which are preferably formed in one piece, as shown.

The cross brace D connects the handle bars in rear of the salient portions $a^2$ of the bars and greatly stiffens these portions and prevents the same from springing or bending under severe shocks or strains. The forwardly-converging braces E connect the handle bars in front of their salient portions and add greatly to the rigidity of the structure.

The braces D E form in connection with the handle bars a light and rigid structure which is not liable to bend, twist, sag or otherwise change its form under the various strains to which it is subjected in use. When the plow is thrown on its side, as is frequently the case in the use of a plow, the handle bar strikes on its bulging or salient portion $a^2$, which is well able to sustain the shock and strain without injury or change of form. This salient or bulging portion so prevents the handle itself from striking the ground, which, if it occurred, would be liable to break or otherwise injure the handle, particularly when the latter is made of wood, which material is to be preferred for the handles.

I claim as my invention:

1. A plow comprising handle bars which diverge from the handles forwardly to points located laterally further than the handles and converging from these points forwardly to the standard, substantially as set forth.

2. In a plow, the combination of handle bars comprising forwardly converging main portions and rearwardly converging rear portions, handles at the rear ends of said rear portions, and a cross brace connecting said rear portions in rear of their junctions with said main portions, substantially as set forth.

3. In a plow, the combination of handle bars comprising forwardly converging main portions and rearwardly converging rear portions, handles at the rear ends of said rear portions, a cross brace connecting said rear portions in rear of their junctions with said main portions, and forwardly diverging braces extending from said cross brace to said front portions in front of said junctions, substantially as set forth.

Witness my hand this 30th day of September, 1904.

GEORGE WIARD.

Witnesses:
JOHN W. PRATT,
CHARLES W. BUCHHOLTZ.